United States Patent
Sahin et al.

(10) Patent No.: US 11,223,958 B1
(45) Date of Patent: Jan. 11, 2022

(54) DISTRIBUTING SPECTRAL RESOURCES BETWEEN INTERFERING CELLS

(71) Applicant: Facebook, Inc., Menlo Park, CA (US)

(72) Inventors: Mustafa Emin Sahin, Northridge, CA (US); Abhishek Tiwari, Oak Park, CA (US); Pratheep Bondalapati, Woodland Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/936,801

(22) Filed: Jul. 23, 2020

Related U.S. Application Data

(60) Provisional application No. 62/945,137, filed on Dec. 7, 2019.

(51) Int. Cl.
*H04W 16/10* (2009.01)
*H04W 16/32* (2009.01)

(52) U.S. Cl.
CPC .......... *H04W 16/10* (2013.01); *H04W 16/32* (2013.01)

(58) Field of Classification Search
CPC .. H04W 16/00–16/32; H04W 28/00–28/0236; H04W 28/0289
See application file for complete search history.

(56) References Cited

U.S. PATENT DOCUMENTS

| | | | |
|---|---|---|---|
| 6,094,584 A * | 7/2000 | Khanna | H04W 16/10 455/452.2 |
| 7,423,989 B2 | 9/2008 | Hansen et al. | |
| 8,543,123 B2 | 9/2013 | Moon et al. | |
| 2010/0254344 A1* | 10/2010 | Wei | H04W 16/10 370/330 |
| 2012/0020246 A1 | 1/2012 | Hand et al. | |
| 2016/0065710 A1* | 3/2016 | Lee | H04M 1/6091 455/41.3 |
| 2017/0272131 A1 | 9/2017 | Ananth et al. | |

* cited by examiner

*Primary Examiner* — Ronald Eisner
(74) *Attorney, Agent, or Firm* — Brian R. Short

(57) ABSTRACT

Apparatuses, methods, and systems for distributing resource block between interfering cells, are disclosed. One method includes allocating resource blocks to a plurality of macro-cells and a plurality of sectors of a supercell, wherein the supercell includes a wireless communication cell that provides wireless coverage to a larger region than the plurality of macro-cells and includes the plurality of sectors, wherein each of the macro-cells provide wireless coverage that at least partially overlaps with a region of wireless coverage of the supercell, wherein the supercell includes one or more supercell sector coverage areas that are interfered by at least one macro-cell. The allocating the resource blocks includes determining which of the plurality of macro-cells wirelessly interfere with which of the plurality of sectors, and determining, for each interfered sector, a total unmet demand of the interfered sector and interfering macro-cells for a coverage area of the interfered sector.

20 Claims, 14 Drawing Sheets

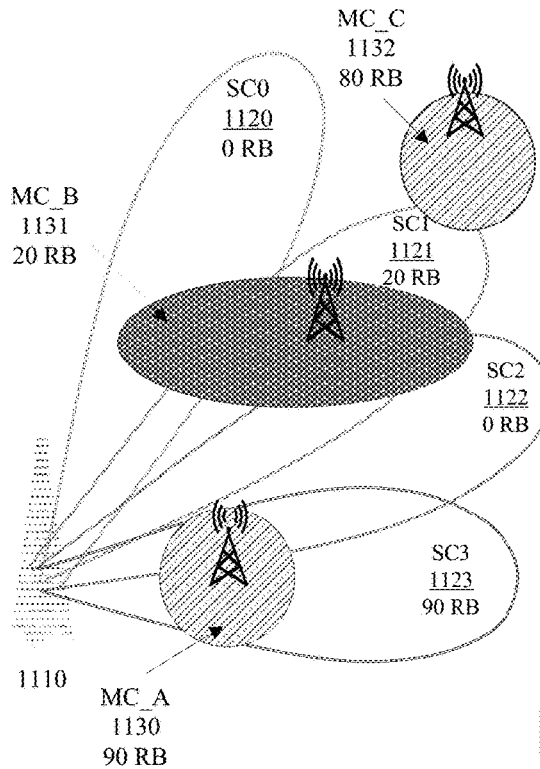

1150 (Step 0)

|  | SC0 Area | SC1 Area | SC2 Area | SC3 Area |
|---|---|---|---|---|
| Sector Demand | 0 | 20 | 0 | 90 |
| MC_A |  |  | 90 | 90 |
| MC_B | 20 | 20 | 20 |  |
| MC_C |  | 80 |  |  |
| Unmet Demand | 20 | 120 | 110 | (180) |

*Start to calculate from the coverage area with the highest (unmet) demand*

1151 (Step 1)

| Demand | SC0 Area | SC1 Area | SC2 Area | SC3 Area |
|---|---|---|---|---|
| Sector | 0 | 20 | 0 | 100 → (90/(180))*100=50 |
| MC_A |  |  | 90 | 70 → (90/(180))*100=50 |
| MC_B | 20 | 20 | 20 |  |
| MC_C |  | 80 |  |  |
| Unmet | 20 | 120 | 110 | 180 |

1152 (Step 2)

| Demand | SC0 Area | SC1 Area | SC2 Area | SC3 Area |
|---|---|---|---|---|
| Sector | 0 | 20 → (20/(120))*100=17 |  | 50 |
| MC_A |  |  | 50 | 50 |
| MC_B | 20 | 20 → (20/(120))*100=17 | 20 |  |
| MC_C |  | 80 → (80/(120))*100=66 |  |  |
| Unmet | 20 | 120 | 20 | 0 |

1153 (Step 3)

| Demand | SC0 Area | SC1 Area | SC2 Area | SC3 Area |
|---|---|---|---|---|
| Sector | 0 | 17 | 0 | 50 |
| MC_A |  |  | 50 | 50 |
| MC_B | 17 | 17 | 17 |  |
| MC_C |  | 66 |  |  |
| Unmet | 0 | 0 | 0 | 0 |

1154 (Demands)

|  | SC0 Area | SC1 Area | SC2 Area | SC3 Area |
|---|---|---|---|---|
| Sector Demand | 0 | 20 | 0 | 90 |
| MC_A |  |  | 90 | 90 |
| MC_B | 20 | 20 | 20 |  |
| MC_C |  | 80 |  |  |

1155 (Final Status)

|  | SC0 Area | SC1 Area | SC2 Area | SC3 Area |
|---|---|---|---|---|
| Sector Demand | 0 | 17 | 0 | 50 |
| MC_A |  |  | 50 | 50 |
| MC_B | 17 | 17 | 17 |  |
| MC_C |  | 66 |  |  |

FIGURE 11

Allocating resource blocks to a plurality of macro-cells and to at least one of a plurality of sectors of a supercell, wherein the supercell comprises a wireless communication cell that provides wireless coverage to a larger region than the plurality of macro-cells and includes the plurality of sectors, wherein each of the macro-cells provide wireless coverage that at least partially overlaps with a region of wireless coverage of the supercell, wherein the supercell includes one or more supercell sector coverage areas that are interfered by at least one macro-cell
1310

Wherein allocating the resource blocks includes determining which of the plurality of macro-cells wirelessly interfere with which of the plurality of sectors
1320

Wherein allocating the resource blocks further includes determining, for each interfered sector, a total unmet demand of the interfered sector and interfering macro-cells for a coverage area of the interfered sector
1330

DISTRIBUTING SPECTRAL RESOURCES BETWEEN INTERFERING CELLS

RELATED APPLICATIONS

This patent application claims priority to U.S. Patent Application Ser. No. 62/945,137 filed Dec. 7, 2019, which is herein incorporated by reference.

FIELD OF THE DESCRIBED EMBODIMENTS

The described embodiments relate generally to wireless communications. More particularly, the described embodiments relate to systems, methods and apparatuses for distributing spectral resources between cells with overlapping coverage areas to avoid interference between the interfering cells.

BACKGROUND

There is a constant need to improve and supplement wireless communication networks. It is desirable to have methods, apparatuses, and systems for distributing resource blocks, which are spectral resources allocated to a certain user for a certain period of time, between interfering cells in a brown-field deployment in order to avoid interference.

SUMMARY

An embodiment includes a method. The method includes interference avoidance by allocating non-overlapping resource blocks, where a resource block designates spectral resources that can be allocated to user of a plurality of macro-cells and to a plurality of sectors of a supercell for a certain period of time. The method includes allocating resource blocks to a plurality of macro-cells and to at least one of a plurality of sectors of a supercell, wherein the supercell comprises a wireless communication cell that provides wireless coverage to a larger region than the plurality of macro-cells and includes the plurality of sectors, wherein each of the macro-cells provide wireless coverage that at least partially overlaps with a region of wireless coverage of the supercell, wherein the supercell includes one or more supercell sector coverage areas that are interfered by at least one macro-cell. The allocating the resource blocks includes determining which of the plurality of macro-cells wirelessly interfere with which of the plurality of sectors, and determining, for each interfered sector, a total unmet demand of the interfered sector and interfering macro-cells for a coverage area of the interfered sector.

Another embodiment includes a wireless network. The wireless network includes a supercell, the supercell providing wireless coverage of a region, and a plurality of macro-cells that provide wireless coverage that covers and interferes with at least some sectors of the supercell. The supercell comprises a wireless communication cell that provides wireless coverage to a larger region than the plurality of macro-cells and includes the plurality of sector sectors. Each of the macro-cells provide wireless coverage that at least partially overlaps with a region of wireless coverage of the supercell, wherein the supercell includes one or more supercell sector coverage areas that are interfered by at least one macro-cell. The wireless network further includes a central controller that is interfaced with the supercell and the plurality of macro-cells, the central controller operative to allocate resource blocks to a plurality of macro-cells and to a plurality of supercell sectors of a supercell, comprising the central controller operating to determine which of the plurality of macro-cells wirelessly interfere with which of the supercell sectors, and determine, for each interfered supercell sector, a total unmet demand of the supercell sector and interfering macro-cells for a supercell sector coverage area of the supercell sector.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 11 show a sequence of actions for allocating resource blocks for three macro-cells interfering with four sectors, according to an embodiment.

FIG. 13 is a flow chart that include steps of a method of distributing resource block between interfering cells, according to an embodiment.

DETAILED DESCRIPTION

Figure 1:
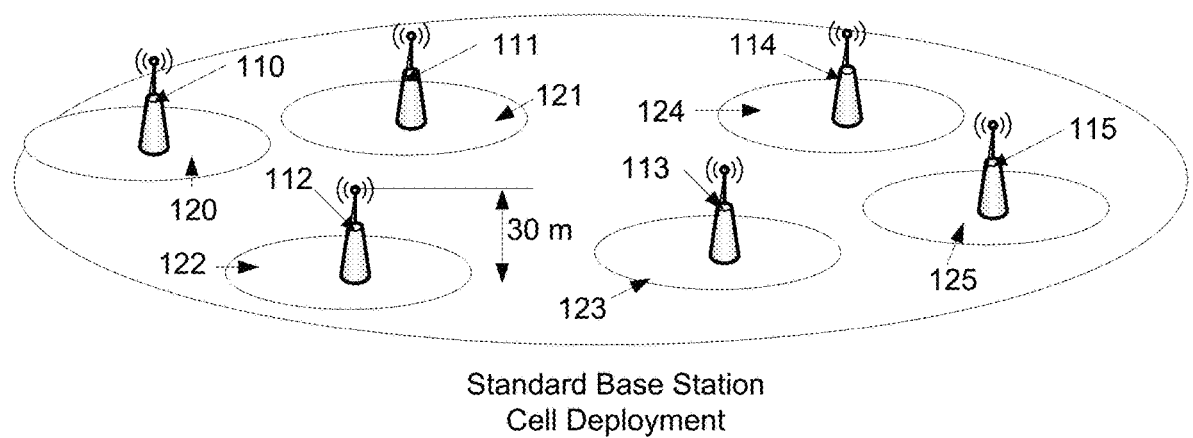
FIG. 1 shows a network that includes conventional base station towers, according to an embodiment.

The embodiments described include methods, apparatuses, and systems for distributing resource blocks between interfering cells. Brown-field deployment is a term used to refer to a wide area coverage cell, which for an embodiment can be a supercell, is being deployed in an area that is already at least partially covered by existing cells (macrocells). In brownfield deployments it is necessary to avoid the interference between the newly deployed cell (such as, a supercell) and the existing cells (such as, macro-cells), also known as inter-cell interference (ICI). Typical methods to avoid ICI include changing the antenna tilts, modifying the configuration parameters, or distributing the available resource blocks between interfering parties.

The split of the available resource blocks between the competing macro-cells and supercell sectors is typically performed in a static manner. In this case the interfering parties maintain the resource blocks dedicated to them regardless of the demand for resources coming from their users. For at least some of the described embodiments, instead of splitting the resource blocks in a static manner, the resource blocks are distributed between interfering cells (supercells and macro-cells) in a dynamic manner taking into account the demand in each of the interfering cells.

When a supercell sector interferes with one or more macro-cells within its coverage area X, allocating the resource blocks requires (1) determining which of the plurality of macro-cells wirelessly interfere with which of the supercell sectors, and (2) calculating, for the coverage area of each interfered supercell sector, a total unmet demand for resource blocks (RBs) reported by the supercell sector and the interfering macro-cells, where the demand for RBs originate from the users of the supercell sector and the interfering macro-cells. A dynamic distribution of RBs requires monitoring (for example, periodic monitoring) of the demand for RBs. If the total demand for RBs in a supercell sector coverage area exceeds the total number of RBs available, then the demanded number of RBs cannot be allocated as demanded. A reasonable way of distributing the RBs is to take consider the ratio of the number of demanded RBs to the aggregate demand in that sector coverage area. This way, a fair distribution is achieved by putting a cap on the number of RBs that can be granted to each interfering party (cell).

The resource block (RB) allocation gets more complicated when some of the interfering macro-cells interfere with more than one supercell sector. Then, since the cap that will be dictated on the macro-cell will potentially be different in each sector coverage area where it interferes, a well-established step-by-step process needs to be implemented to determine the grants to each of the macro-cells and supercell sectors involved. The described embodiments provide the processing needed to determine the RB allocation grants to each of the macro-cells and supercell sectors.

For an embodiment, a sectorized supercell base station is distinguishable from a macro-cell because the wireless coverage area of the sectorized supercell base station is greater than the coverage area of any of the macro-cells, and the number of sectors of the sectorized supercell base station is greater than any of the macro-cells of the wireless network.

FIG. 1 shows a network that includes conventional base station towers, according to an embodiment. For an embodiment, the standard base stations 110, 111, 112, 113, 114, 115, have a height, and therefore, an antenna elevation of about 30-60 meters. Further, each of the standard base stations has a cell coverage area 120, 121, 122, 123, 124, 125.

Figure 2:
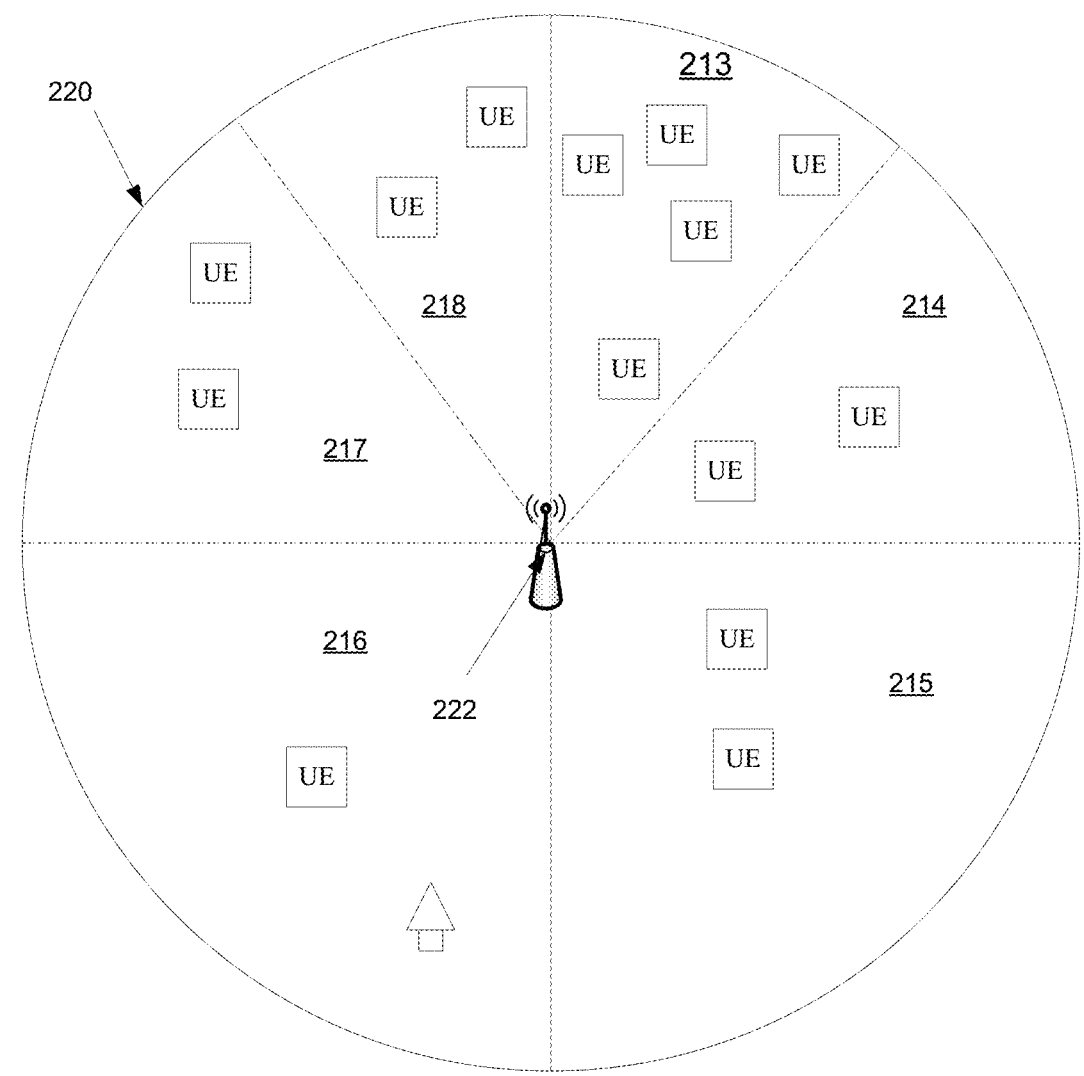
FIG. 2 shows a cell of a base station that includes sectoring, according to an embodiment.

FIG. 2 shows a cell of a supercell base station that includes sectoring, according to an embodiment. As shown, the coverage area 220 of the sectorized supercell base station 222 is divided into sectors 213, 214, 215, 216, 217, 218 wherein each sector covers a section of the total coverage area 220 of cell of the base station 222. Generally, for an embodiment, each sector includes a radio and an array of antennas that operate to form a beam in which wireless signals can be transmitted and/or received from wireless devices. For an embodiment, the width of the beam is directly related to the gain of the sector beam and therefore to the coverage area of the sector. For an embodiment, the sectorized supercell base station 222 is taller than the standard base stations of cell coverage areas 120, 121, 122, 123, 124, 125 of FIG. 1.

Elevating base stations to greater heights above ground and by using the high gain of narrow beam width sectors provides improved propagation (ranges of 20-75 km) and presents an opportunity to reduce the total cost of ownership for the network infrastructure operator by deploying fewer elevated base stations to cover the same area. Further, improved propagation (coverage) range provided by an elevated base station requires the base station to serve greater capacity to satisfy the demand. For an embodiment, the sectorized supercell base stations have a greater height than the cellular base stations.

For at least some embodiments, the tall base stations form super cells that are much larger than cells formed by standard cellular networks. For an embodiment, high-order sectoring can be provided by a Luneburg lens antenna. Further, for an embodiment, the antenna includes a high-power amplifier array. Further, base band processing of the base station can be located at a lower elevation than the antenna array of the base station, and communication signals and power can be provided to the antenna array through a fiber. Further, the described embodiments of sectorization can be waveform agnostic and allow the wireless base station to support wireless communication standards that do not utilize channel state information.

Figure 3:
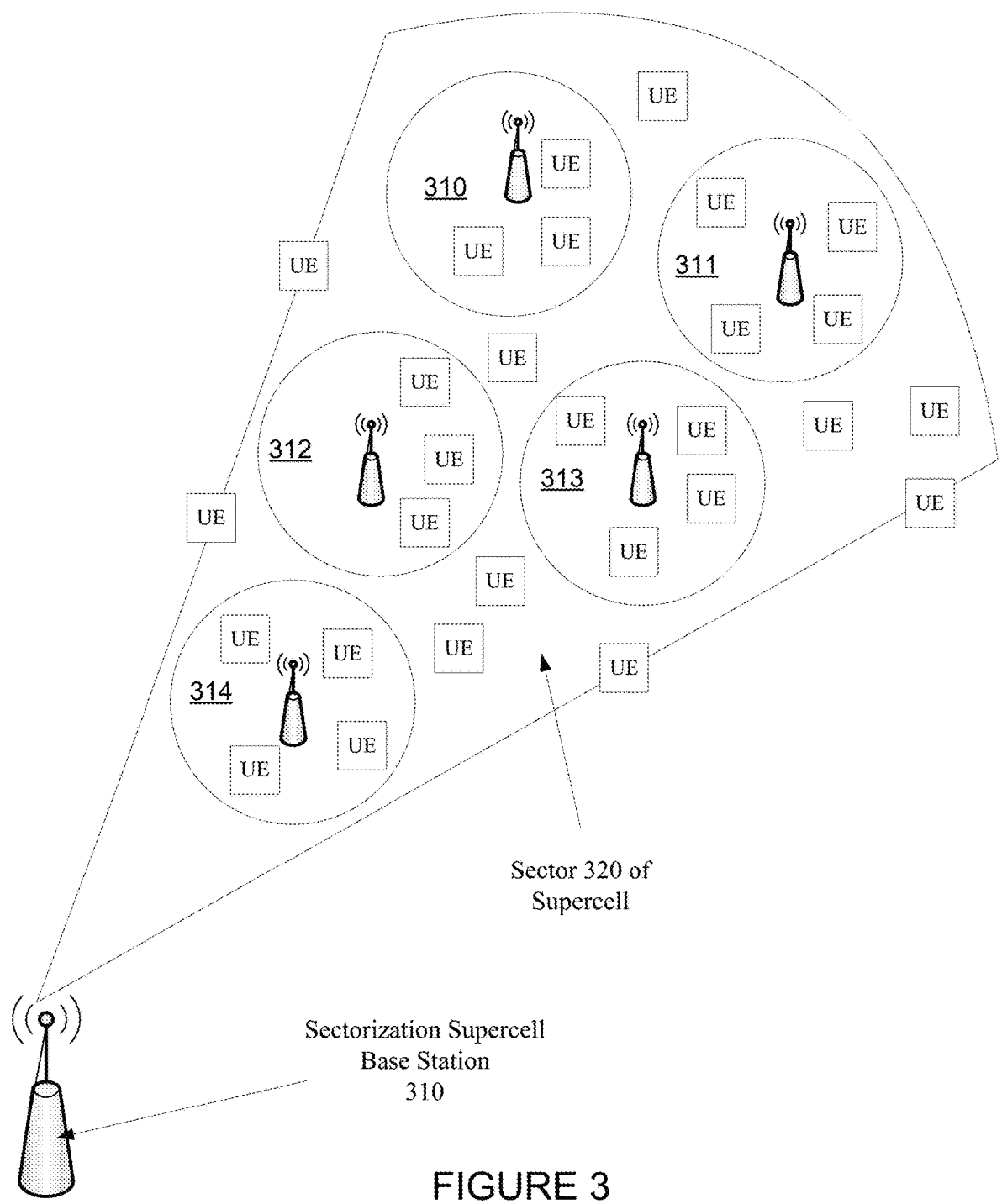
FIG. 3 shows a sector of a sectorized supercell base station in which a coverage area of the sector overlays coverage areas of multiple cells of a standard cellular network, according to an embodiment.

FIG. 3 shows a sector 320 of a sectorized supercell base station 310 in which a coverage area of the sector 320 overlays coverage areas of multiple cells 310, 311, 312, 313, 314 of a standard cellular network, according to an embodiment. As shown, the user equipment (UEs) are provided with wireless connectivity either by cellular base stations of the wireless cells 310, 311, 312, 313, 314, or by the sector 320 of a supercell formed by the sectorized supercell base station 310. Accordingly, each of the user equipment UEs wirelessly communicates either with the cellular base stations of the wireless cells 310, 311, 312, 313, 314, or with the sector 320 of the sectorized supercell base station 310. It is to be understood that for at least some embodiment, the cellular base stations might have sectors as well.

Generally, for at least some embodiments, the plurality of cellular base stations (such as the base stations of the wireless cells 310, 311, 312, 313, 314) provide wireless access to a plurality of wireless devices (such as, the user equipment (UEs) of FIG. 3) over a coverage area. The sectorized supercell base station (such as, the supercell of the sector 320) provides wireless communication to the plurality of wireless devices over at least the coverage area, wherein the sectorized supercell base station includes a plurality of antennas operating to form a plurality of sectors, wherein each sector of the plurality of antennas operates to cover a selectable coverage area as determined by a width of a beamforming pattern formed by a subset of the plurality of antennas of the sector.

Figure 4A:
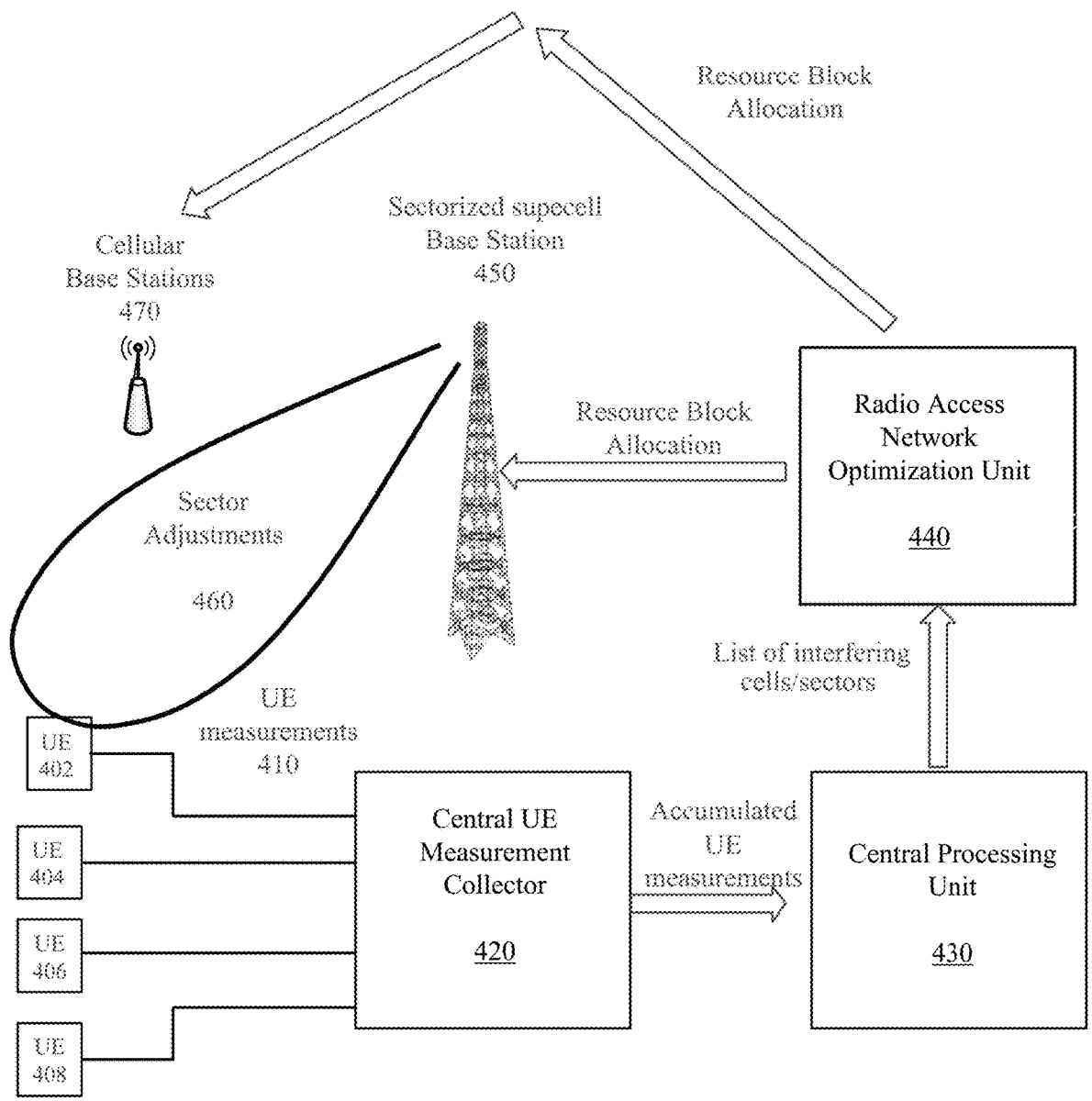
FIG. 4A shows a logical architecture of a wireless system that includes controlling resource block allocation of a sectorized supercell base station and macro-cells, based on interference between the sectorized supercell base station and macro-cells, according to an embodiment.

FIG. 4A shows a logical architecture of a wireless system that includes controlling resource block allocation of a sectorized supercell base station and macro-cells, based on interference between the sectorized supercell base station and macro-cells, according to an embodiment. The wireless system includes multiple UEs 402, 404, 406, 408 that sense and measure signal quality parameters of wireless signals being used for wireless communication with the UEs 402, 404, 406, 408. Further, the UEs 402, 404, 406, 408 can determine their location through, for example, global positioning system (GPS) receivers. For an embodiment, the UE measurements 410 are provided to a central UE measurement collector 420. For an embodiment, the central UE measurement collector 420 includes a central tool (software) that collects certain UE data and measurements such as RSSI, SINR, Physical Cell Identity (PCI) of the serving cell, and/or latitude and longitude of the corresponding UE. For an embodiment, the wireless signal received by the UEs include information that allow for a determination of which macro-cell (such as macro-cell 470) or which supercell sector the wireless signal was originated or transmitted. Accordingly, interfering macro-cells and sectors of supercells can be identified.

For an embodiment, a central processing unit 430 uses the collected data and detects or determines the interfering macro-cells and supercell (sectorized supercell base station) sectors. Alternatively, or additionally, for an embodiment, the central processing unit 430 calculates the figure of merit for each supercell (sectorized supercell base station) sector after activation.

For an embodiment, Radio Access Network (RAN) Optimization Unit 440 receives the information of interfering cells/sectors and determined and distributes resource block between the interfering macro-cells (such as, macro-cell 470) and the sector 460 of the sectorized supercell base station 450. For at least some embodiments, a selected or set number of resource blocks are available to the network of macro-cells and supercell sectors for wireless communication with the UEs.

For an embodiment, a resource block is a frequency and time allocation available for wireless communication. Each resource block can be allocated to a macro-cell, or to a sector of the sectorized supercell base station.

Figure 4B:
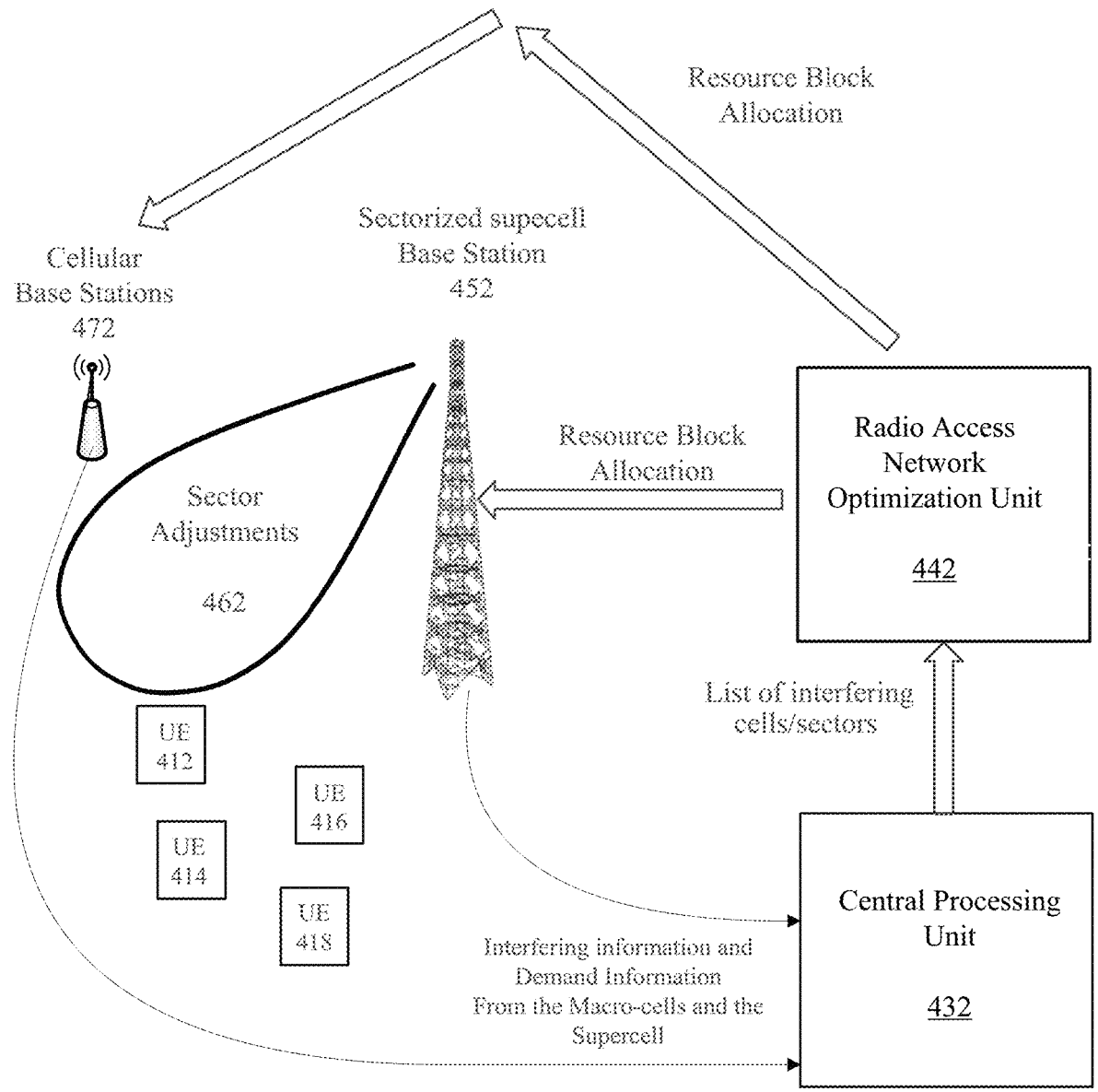
FIG. 4B shows a logical architecture of a wireless system that includes controlling resource block allocation of a sectorized supercell base station and macro-cells, based on interference between the sectorized supercell base station and macro-cells, according to an embodiment.

FIG. 4B shows a logical architecture of a wireless system that includes controlling resource block allocation of a sectorized supercell base station and macro-cells, based on interference between the sectorized supercell base station and macro-cells, according to an embodiment. FIG. 4B shows an embodiment in which a central processing unit (controller) 432 receives information from the macro-cells 472 and the supercell base station 462. The central processing unit 432 generates a list of interfering macro-cells and sectors which are provided to a radio access network (RAN) optimization unit 442.

For an embodiment, the radio access network (RAN) optimization unit 442 receives the information of interfering cells/sectors and determined and distributes resource block between the interfering macro-cells (such as, macro-cell 472) and the sector of the sectorized supercell base station 452. For at least some embodiments, a selected or set number of resource blocks are available to the network of macro-cells and supercell sectors for wireless communication with the UEs. The wireless system includes multiple UEs 412, 414, 416, 418.

Figure 5:
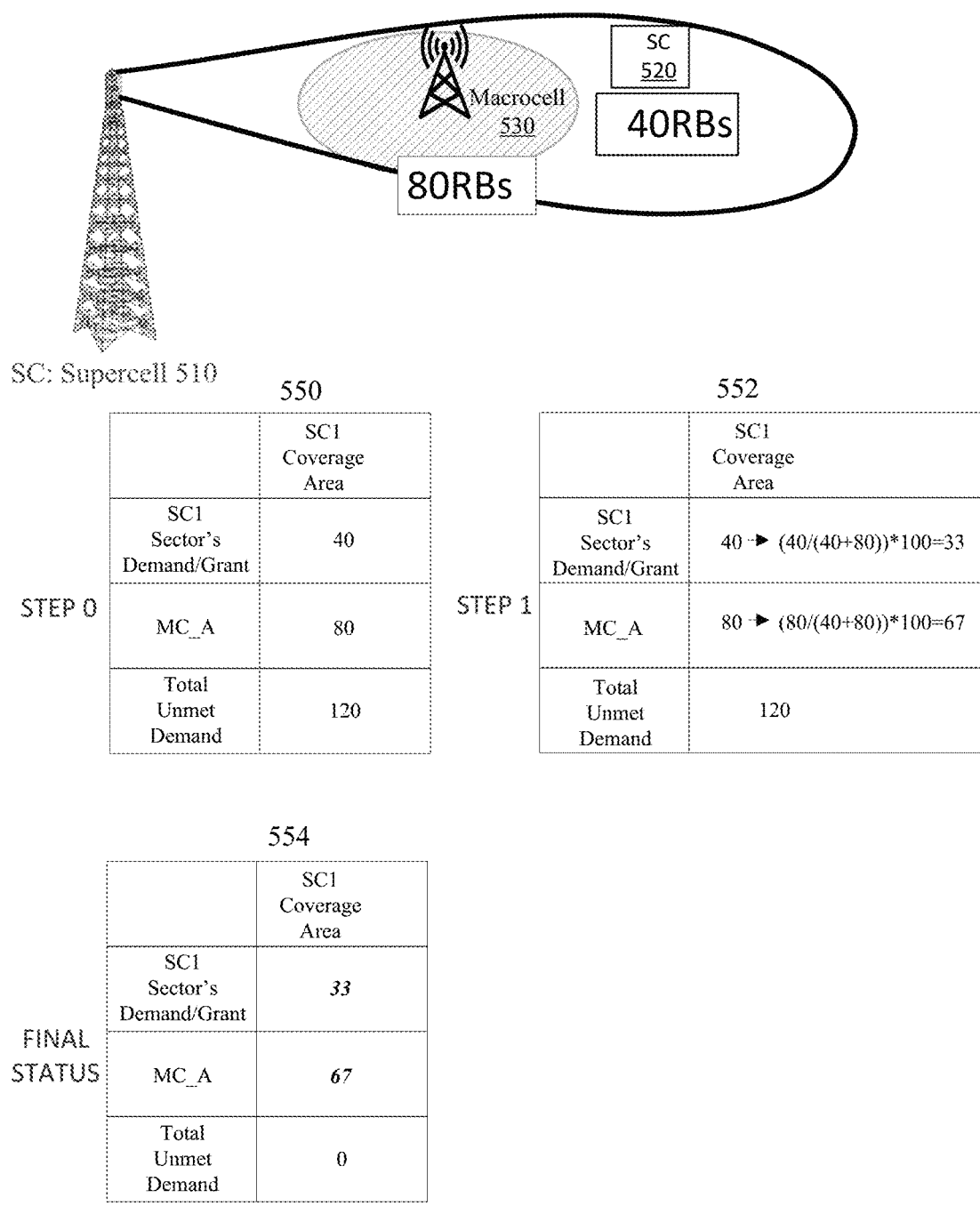
FIG. 5 shows a single sector of a supercell base station interfering with a single macro-cell, according to an embodiment.

FIG. 5 shows a single sector 520 of a supercell base station 510 interfering with a single macro-cell 530, according to an embodiment. At least some embodiments include dynamically distributing available resource blocks (RBs) between the interfering macro-cells and one or more sectors of the sectorized supercell base station 520. For at least some embodiments, include using an average number of RBs demanded by the UEs connected to the interfering parties (interfering macro-cells and sectors of the sectorized supercell base station) over a certain time window.

For at least some embodiments, the grants (RB grants) for each interfering party (interfering macro-cells and sectors of the sectorized supercell base station) is determined as follows:

$$Cap\_MC = N\_RBs \times \{Demand\_MC/(Demand\_MC + Demand\_SC)\} Grant\_MC = \min\{Demand\_MC, Cap\_MC\}$$

$$Cap\_SC = N\_RBs \times \{Demand\_SC/(Demand\_MC + Demand\_SC)\} Grant\_SC = \min\{Demand\_SC, Cap\_SC\},$$

Where:

Cap_MC is a maximum number of RBs that could potentially be granted to a Macro-cell.

N_RBs is the number of resource blocks available for allocation between the macro-cells and the sectors of the sectorized supercell base station.

Demand_MC is the aggregate number of RBs demanded by UEs in (connected to) the Macro-cell Demand_SC is the aggregate number of RBs demanded by UEs in (connected to) the supercell sector.

Grant_MC is the number of RBs that are actually granted to Macro-cell

Grant_SC is the number of RBs that are actually granted to the sector of the supercell.

The application of the calculations will be clear when applied to different interfering situations. For an embodiment, the distribution of the resource blocks (RBs) between the macro-cell(s) and the sector(s) is determined by the central controller upon receiving the interference relationships. The numbers of allocated RBs can then be conveyed by the central controller to the interfering parties.

Referring back to FIG. 5, the supercell sector (SC) is demanding 40 RBs while macro-cells is demanding 80 RBs. An initial step (step 0) of table 550 includes identifying the number of resource blocks being demanded by the users of each of the supercells and the macro-cells. As shown, the first sector SC1 demands the 40 RBs and the macro-cell MC_A demands 80 RBs, and the total unmet demand is 120 RBs.

A first step (step 1) of table 552 shows an allocation of available RBs (100 RBs are available) to each of the SC1 and the MC_A. For the SC1, the allocated RBs is a ratio of the available RBs. More specifically, the RBs allocated to the SC1 is (40/(40+80))*100=33 RBs. The number of RBs allocated to the MC_A is (80/(40+80))*100=67 RBs.

A final status (table 554) depicts the allocated number of grants to the first supercell sector (SC1) of 33 RBs, the microcell A of 67 RBs. The RBs can be scheduled between the SC1 and the MC_A based on the determined number of RBs allocated to the SC1 and the MC_A.

Figure 6:
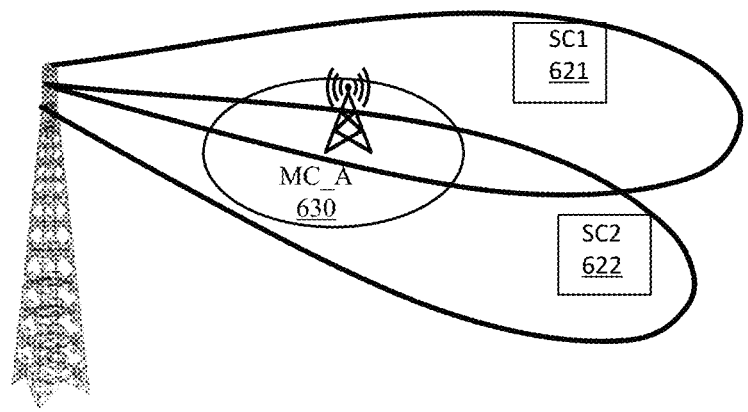
FIG. 6 shows multiple sectors of a supercell base station interfering with a single macro-cell, according to an embodiment.
Figure 7:
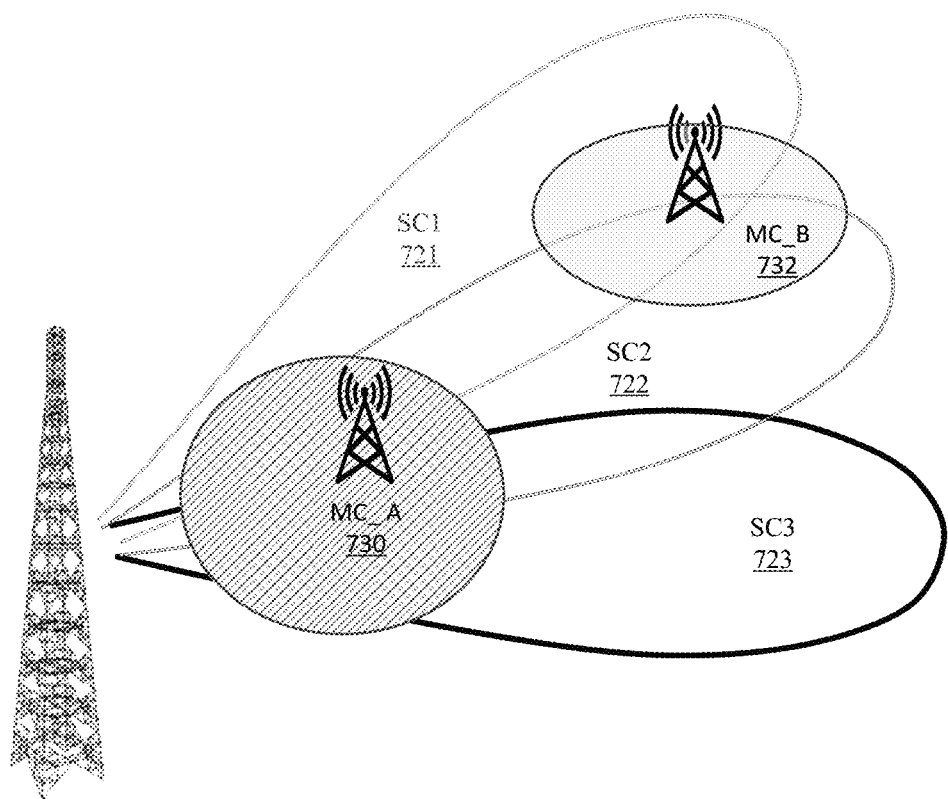
FIG. 7 shows multiple sectors of a supercell base station interfering with multiple macro-cells, according to an embodiment.

FIG. 6 shows multiple sectors (SC1 621, SC2 622) of a supercell base station 610 interfering with a single macro-cell (macro-cell A) 630, according to an embodiment. For an embodiment, a mutual relationship between the macro-cell 630 and the sectors (SC1, SC2) are taken into account when the macro-cell 620 interferes with multiple sectorized supercell sectors (SC1, SC2). Specifically, the total demand in each sector's coverage area dictates a different cap on the number of RBs that can be granted to the interfering macro-cell. For an embodiment, a macro-cell that is interfering with multiple sectors includes computation of the cap on its number of RBs based on the sector coverage area with maximum total demand FIG. 7 shows multiple sectors (SC1 721, SC2 722, SC3 723) of a supercell base station 710 interfering with multiple macro-cells (MC_A 730, MC_B 732), according to an embodiment. At least some embodiments include execution of a sequential procedure when there are multiple macro-cells that have common interferers from Supercell sectors. For an embodiment, when a grant is calculated for a macro-cell, it is subtracted from all available resource blocks.

Figure 8:
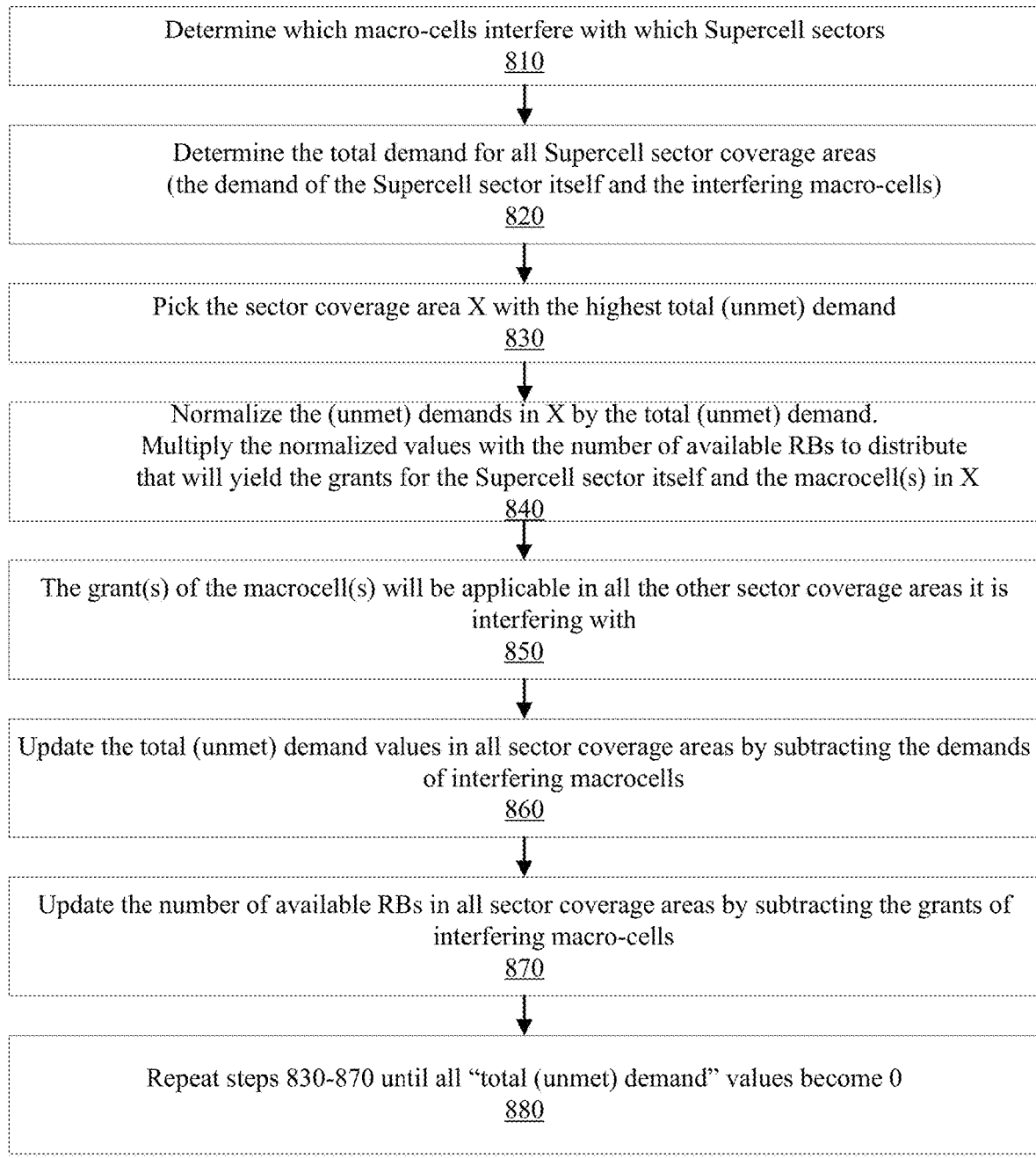
FIG. 8 is a flow chart that includes steps of a method of allocated resource blocks between sectors of a supercell and macro-cells, according to an embodiment.

FIG. 8 is a flow chart that includes steps of a method of allocated resource blocks between sectors of a supercell and macro-cells, according to an embodiment. A first step 810 includes determine which macro-cells interfere with which sectorized supercell base station sectors. For at least some embodiments, wireless signals transmitted from the macro-cells and from the sectors of the sectorized supercell base station are identifiable. That is, EUs that receive the signals are able to identify where the wireless signals received have come from. Therefore, the EUs receive the wireless signals, and report to a controller received signals metrics and identifications. Accordingly, the controller is able to identify which of the macro-cells interfere with which of the sectors.

A second step 820 includes determining a total demand for all Supercell sector coverage areas. For an embodiment, the total demand is determined by the demand of the sector itself and all of the macro-cells that interfere with the sector.

A third step 830 includes picking or selecting the sector coverage area X with the highest total (unmet) demand. That is, if there are multiple sectors in which the RBs are being allocated, the sector with the greatest total demand is analyzed first.

A fourth step 840 includes normalizing the (unmet) demands in X by the total (unmet) demand. For an embodiment, the includes multiplying normalized values with the number of available RBs to distribute, which yields the grants for the supercell sector itself and to the macro-cell(s) overlapping with X.

A fifth step 850 includes applying the grants determined for each of the macro-cell(s) overlapping with X to all other sectors that each of the macro-cells is also interfering with.

A sixth step 860 includes update the total (unmet) demand values in all sector coverage areas by subtracting the demands of interfering macro-cells.

A seventh step 870 includes updating the number of available RBs in all sector coverage areas by subtracting the grants of interfering macro-cells.

An eighth step 880 includes repeat steps 830-870 until all "total (unmet) demand" values become 0.

The steps of the method of FIG. 8 will be applied to the different interfering macro-cells and sectors as depicted in FIGS. 9, 10, 11, 12.

Figure 9:
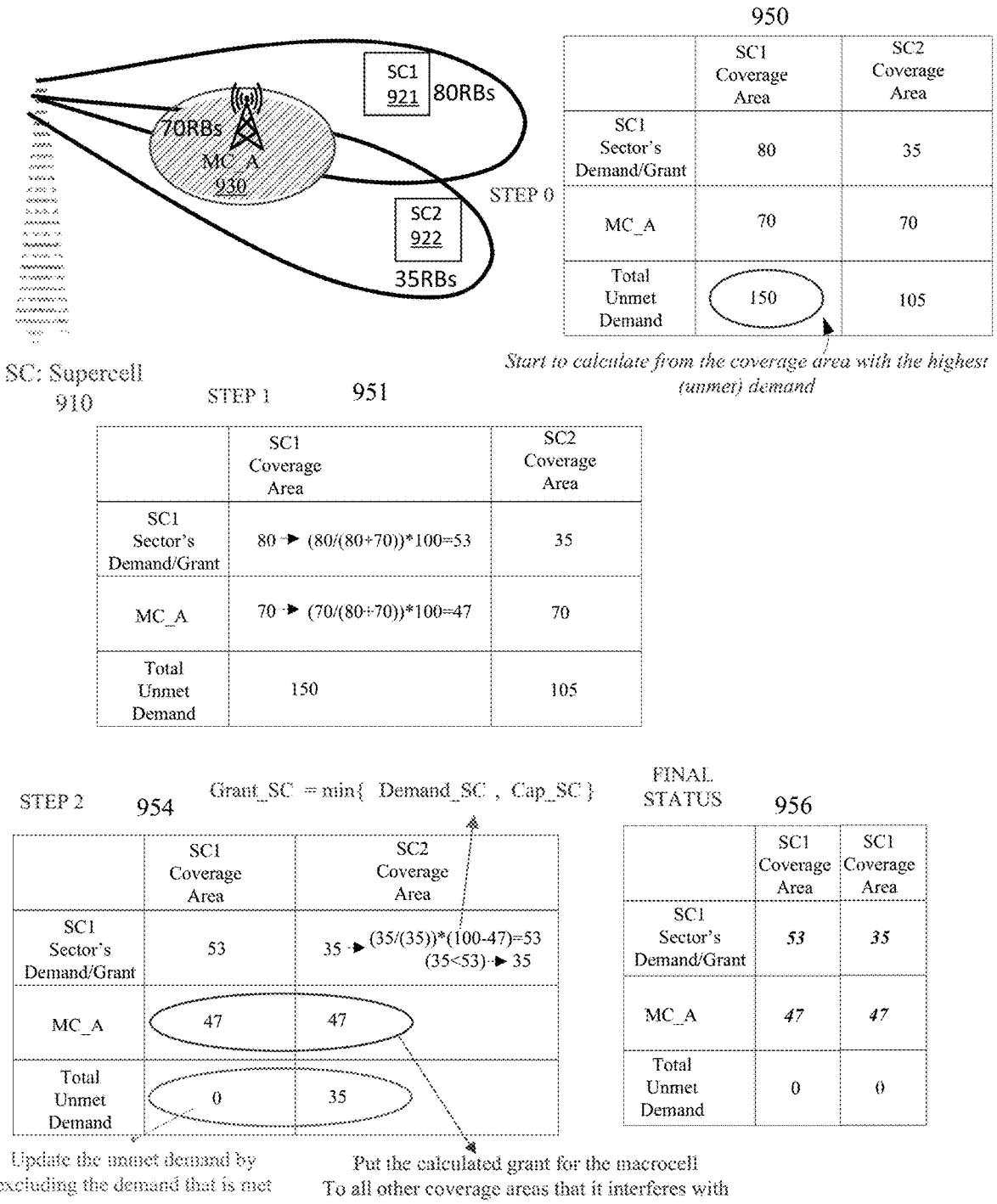
FIG. 9 show a sequence of actions for allocating resource blocks for a single macro-cell interfering with two sectors, according to an embodiment.

FIG. 9 show a sequence of actions for allocating resource blocks for a single macro-cell (MC_A 930) interfering with two sectors (SC1 921, SC2 922), according to an embodiment. For an embodiment, the allocation of RBs is determined by applying the steps of the method of FIG. 8. Application of the first step 810 includes determining which macro-cells interfere with which sectorized supercell base station sectors. FIG. 9 shows the two supercell sectors SC1 920, SC2 922 of a supercell 910. Further FIG. 9 show the interfering microcell A 930. As previously described, the users (UEs) can sense and identify and provide indications of the interfering sectors and macro-cells. Once identified, the number of RBs demanded by users connected to the interfering sectors and macro-cells is determined. As shown, the sector SC1 620 is demanding 80 RBs, the sector SC2 622 is demanding 35 RBs, and the microcell A 630 is demanding 70 RBs.

Application of the second step 820 includes determining a total demand for all supercell sector coverage areas. As shown in table 950 (Step 0), the total unmet demand of the SC1 coverage area is 80+70=150 RBs, and the total unmet demand of the SC2 coverage area is 35+70=105 RBs. The total demand includes the number of RBs demanded by all macro-cells and supercell sectors of the coverage area.

Application of the third step 830 includes picking or selecting the sector coverage area. X with the highest total (unmet) demand. As shown in table 950, the highest total unmet demand is that of SC1 which is demanding 150 RBs, which is greater than the 105 RBs of the sector SC2.

Application of the fourth step 840 includes normalizing the (unmet) demands in X (SC 1 as determined in table 950) by the total (unmet) demand. For an embodiment, the includes multiplying normalized values with the number of available RBs to distribute, which yields the grants for the supercell sector itself and to the macro-cell(s) overlapping with X. This is depicted in table 951 where the grants for the supercell itself (SC1) and the overlapping microcell (MC_A) are determined as 53 RBs for SC1 and 47 RBs for MC_A. That is, the normalization includes dividing the number of RB demanded by the SC1 80 by the total unmet demand of the SC1 of 80+70=150, and dividing the number RB demanded by MC_A 70 by the total unmet demand of the SC1 of 80+70=150.

Application of the fifth step 850 includes applying the grants determined for each of the macro-cell(s) overlapping with X (SC1) to all other sectors (SC2) that each of the macro-cells is also interfering with. This is depicted in table 954 (Step 2) as the demand for MC_A for both the SC1 and SC2 coverage areas are updated with 47 RBs. Further, the total unmet demand for the SC1 coverage area is updated to 0.

Application of the sixth step 860 includes updating the total (unmet) demand values in all sector coverage areas by subtracting the demands of interfering macro-cells as depicted by table 954. The total available number of RBs (100) is subtracted by the demands of the interfering micro-cell (MC_A) of 47=53 RBs still to be allocated. The allocation to SC1 in the SC2 coverage area comes to (35/35)*(100−47)=53. However, SC1 is only demanding 35 RBs which is less than the calculated allocation of 47. Therefore, 35 RBs are allocated to SC1 in the SC2 coverage area.

Application of the seventh step 870 includes updating the number of available RBs in all sector coverage areas by subtracting the grants of interfering macro-cells includes updating nothing because the interfering macro-cells have all been addressed.

Table 956 shows the final status of the allocation of granted. RBs to each of the sectorized supercell sectors SC1 921, SC2 922, and to the interfering macro-cell MC_A 930.

Application of the eighth step 880 includes repeat steps 830 870 until all "total (unmet) demand" values become 0. However, all the unmet demand has been met, so no additional steps are required.

Figure 10:
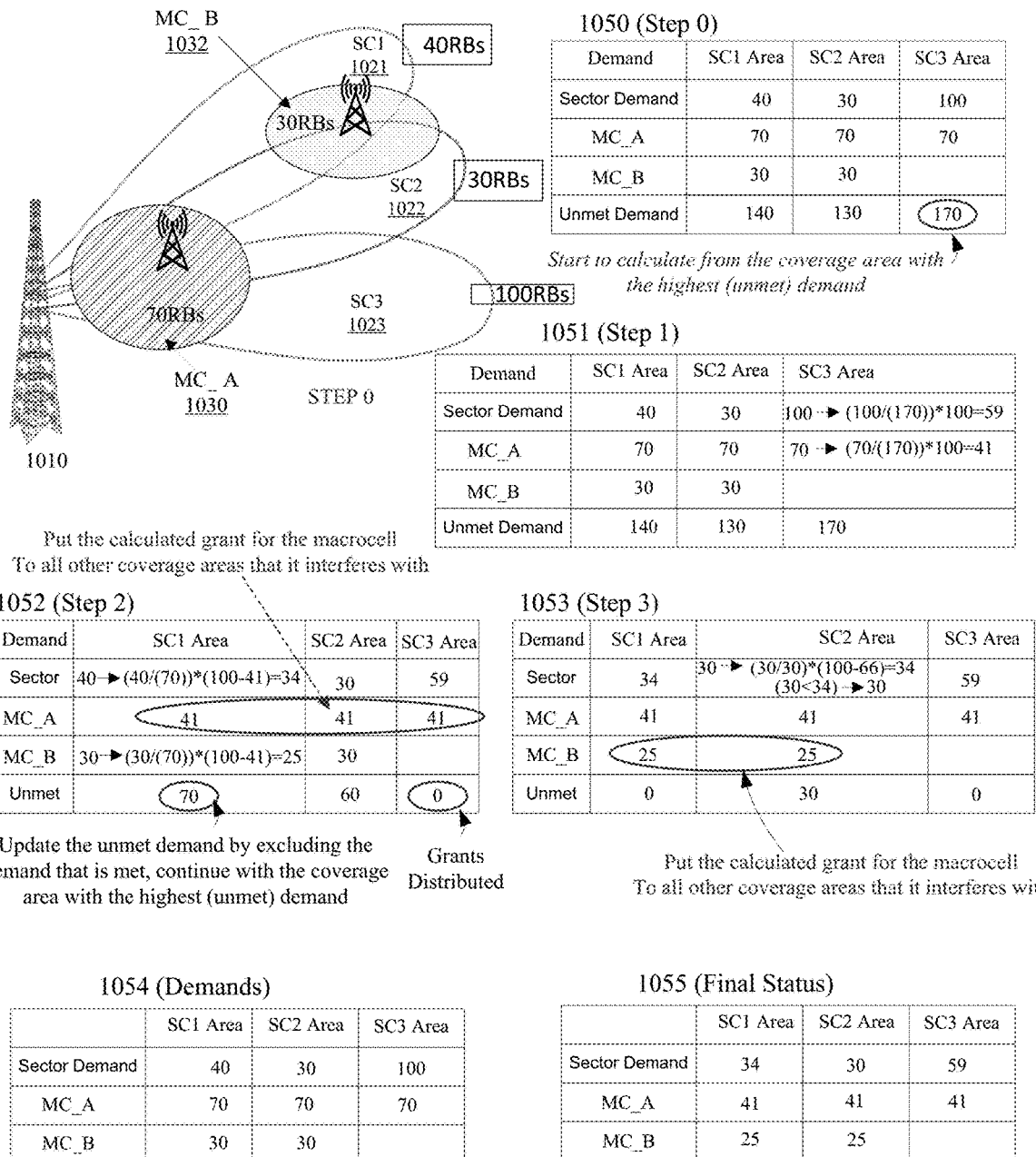
FIG. 10 show a sequence of actions for allocating resource blocks for two macro-cells interfering with three sectors, according to an embodiment.

FIG. 10 show a sequence of actions for allocating resource blocks for two macro-cells (MC_A 1030, MC_B 1032) interfering with three sectors (SC1 1021, SC2 1022, SC3 1023), according to an embodiment. Again, the steps of the method of FIG. 8 can be used to allocate the RBs.

Application of the first step 810 includes determining which macro-cells interfere with which sectorized supercell base station sectors. FIG. 10 shows the three supercell sectors SC1 1021, SC2 1022, SC3 1023 of a supercell 1010. Further FIG. 10 shows the interfering microcells MC_A 1030, MC_B 1032. As previously described, the users (UEs) can sense, identify and provide information of the interfering sectors and macro-cells. Once identified, the number of RBs demanded by users connected to the interfering sectors and macro-cells is determined. As shown, the sector SC1 1021 is demanding 40 RBs, the sector SC2 1022 is demanding 30 RBs, the sector SC3 1023 is demanding 100 RBs, the microcell MC_A 730 is demanding 70 RBs, and the microcell MC_B 732 is demanding 30 RBs.

Application of the second step 820 includes determining a total demand for all supercell sector coverage areas. As shown in table 1050 (Step 0), the total unmet demand of the SC1 1021 coverage area is 40+70+30=140 RBs, the total unmet demand of the SC2 1022 coverage area is 30+70+30=130 RBs, and the total unmet demand of the SC3 1023 coverage area is 100+70=170 RBs.

Application of the third step 830 includes picking or selecting the sector coverage area X with the highest total (unmet) demand. As shown in table 1050, the highest total unmet demand is that of SC3 1023 which is demanding 170 RBs, which is greater than the 130 RBs of the sector SC2, or the 140 RBs of sector SC 1.

Application of the fourth step 840 includes normalizing the (unmet) demands in X (SC 3 as determined in table 1050) by the total (unmet) demand. For an embodiment, the includes multiplying normalized values with the number of available RBs to distribute, which yields the grants for the supercell sector itself and to the macro-cell(s) overlapping with X. This is depicted in table 1051 where the grants for the supercell itself (SC1) and the overlapping microcell (MC_A) are determined as 59 RBs for SC3 and 41 RBs for MC_A. That is, the normalized value of the 100 demanded RBs of SC3 (100/170) are multiplied by the number of available RBs 100, and the normalized value of the 70 RBS of: C A are also multiplied by the number of available RBs 100.

Application of the fifth step 850 includes applying the grants determined for each of the macro-cell(s) overlapping with X (SC3) to all other sectors (SC1, SC2) that each of the macro-cells is also interfering with. This is depicted in table 1052 (Step 2) as the demand for MC_A for the SC1 and SC2 coverage areas are updated with 41 RBs. Further, the total unmet demand for the SC1 coverage area is update to 0.

Application of the sixth step 860 includes update the total (unmet) demand values in all sector coverage areas by subtracting the demands of interfering macro-cells (table 1052 step 2). The total available number of RBs (100) is subtracted by the demands of the interfering microcell (MC_A). That is, 100−41=59 RBs are still to be allocated. The allocation to SC1 comes to (40/70)*(100−41)=34, as the total unmet demand in SC1 is 70, and SC1 is demanding 40 RBs. The allocation to MC_B comes to (30/70)*(100−41)=25 as the total unmet demand in SC1 is 70, and MC_B is demanding 30 RBs. The unmet demand of SC1 is then updated to 0.

Application of the seventh step 870 includes updating the number of available RBs in all sector coverage areas by subtracting the grants of interfering macro-cells. This is shown in table 1053 (step 3) in which the grants to MC_B are updated to 25 RBs. The total available number of RBs (100) is subtracted by the demands of the interfering microcells MC_A (41 RBs)+MC_B (25 RBs)=66 RBs already allocated. The allocation to SC2 comes to (30/30)*(100−66)=34, as the total unmet demand in SC2 is 30, and SC2 is demanding 30 RBs. However, SC2 is only demanding 30 RBs which is less than the allocated 34 RBs. The unmet demand of SC2 is then updated to 0.

Application of the eighth step 880 includes repeat steps 830-870 until all "total (unmet) demand" values become 0.

Table 1054 depicts the number of RBs demanded by each of the sectors SC1, SC2, SC3 and the macro-cells MC_A, MC_B. Table 1055 shows the number of RBs to be allocated based upon the RB allocation processing.

FIG. 11 show a sequence of actions for allocating resource blocks for three macro-cells MC_A 1130, MC_B 1131, MC_C 1132 interfering with four sectors SC0 1120, SC1 1121, SC2 1122, SC3 1123, according to an embodiment.

Application of the first step 810 includes determining which macro-cells interfere with which sectorized supercell base station sectors. FIG. 11 shows the four supercell sectors SC0 1120, SC1 1122, SC2 1122, SC3 1123 of a supercell 1110. Further FIG. 11 shows the interfering microcells MC_A 1130, MC_B 1131, MC_C 1132. Once identified, the number of RBs demanded by users connected to the interfering sectors and macro-cells is determined. As shown, the sector SC0 1120 is demanding 0 RBs, the sector SC1 1121 is demanding 20 RBs, the sector SC2 1122 is demanding 0 RBs, the sector SC3 1123 is demanding 90 RBs, the microcell MC_A 1130 is demanding 90 RBs, the microcell MC_B 1131 is demanding 20 RBs, and the microcell MC_C 1132 is demanding 80 Rills.

Application of the second step 820 includes determining a total demand for all supercell sector coverage areas. As shown in table 1150 (Step 0), the total unmet demand of the SC0 1120 coverage area is 0+20=20 RBs, the total unmet demand of the SC1 1121 coverage area is 20±20±80=120 RBs, the total unmet demand of the SC2 1122 coverage area is 0-1-90+20 110 RBs, and the total unmet demand of the SC3 1123 coverage area is 90±90=180 RBs.

Application of the third step 830 includes picking or selecting the sector coverage area X with the highest total (unmet) demand. As shown in table 1150, the highest total unmet demand is that of SC3 1123 which is demanding 180 RBs, which is greater than the 110 RBs of the sector SC2, or the 120 RBs of sector SC1, or the 20 RBs of sector SC0.

Application of the fourth step 840 includes normalizing the (unmet) demands in X (SC 3 as determined in table 1150) by the total (unmet) demand. For an embodiment, the normalizing includes multiplying normalized values with the number of available RBs to distribute, which yields the grants for the supercell sector itself and to the macro-cell(s) overlapping with X. This is depicted in table 1151 where the grants for the supercell itself (SC1) and the overlapping microcell (MC_A) are determined as 50 RBs for SC3 and 50 RBs for MC_A.

Application of the fifth step 850 includes applying the grants determined for each of the macro-cell(s) overlapping with X (SC3) to all other sectors (SC0, SC1, SC2) that each of the macro-cells is also interfering with. This is depicted in table 1152 (Step 2) as the demand for MC_A in the SC2 coverage areas is updated with 50 RBs. Further, the total unmet demand for the SC3 coverage area is update to 0.

Application of the sixth step 860 includes update the total (unmet) demand values in all sector coverage areas by subtracting the demands of interfering macro-cells (table 1152 step 2). Here, there are no other sector coverage area that are interfered with by the updated macro-cell allocations. The allocation to SC1 comes to (20/120)*(100)=17, as the total unmet demand in SC1 is 120, and SC1 is demanding 20 RBs. The allocation to MC_B comes to (20/120)*(100)=17 as the total unmet demand in SC1 is 120, and MC_B is demanding 20 RBs. The allocation to MC_C comes to (80/120)*(100)=66 as the total unmet demand in SC1 is 120, and MC_B is demanding 80 RBs. The unmet demand of SC1 area is then updated to 0.

Application of the seventh step 870 includes updating the number of available RBs in all sector coverage areas by subtracting the grants of interfering macro-cells. This is shown in table 1153 (step 3) in which the grants to MC_B are updated to 17 RBs for the SC0, SC1, SC2 areas.

Application of the eighth step 880 includes repeat steps 830-870 until all "total (unmet) demand" values become 0. Here, all of the grants for the SC2 area have been allocated. Hence, the unmet demand for the SC2 area is updated to 0, and all of the RB have been allocated.

A table 1154 shows the demands of each of the sectors SC0, SC1, SC2, SC3, and the macro-cells MC_A, MC_B, and MC_C. A table 1155 shows the final status of the allocation of the RBs to each of the sectors SC0, SC1, SC2, SC3, and the macro-cells MC_A, MC_B, and MC_C.

Figure 12:
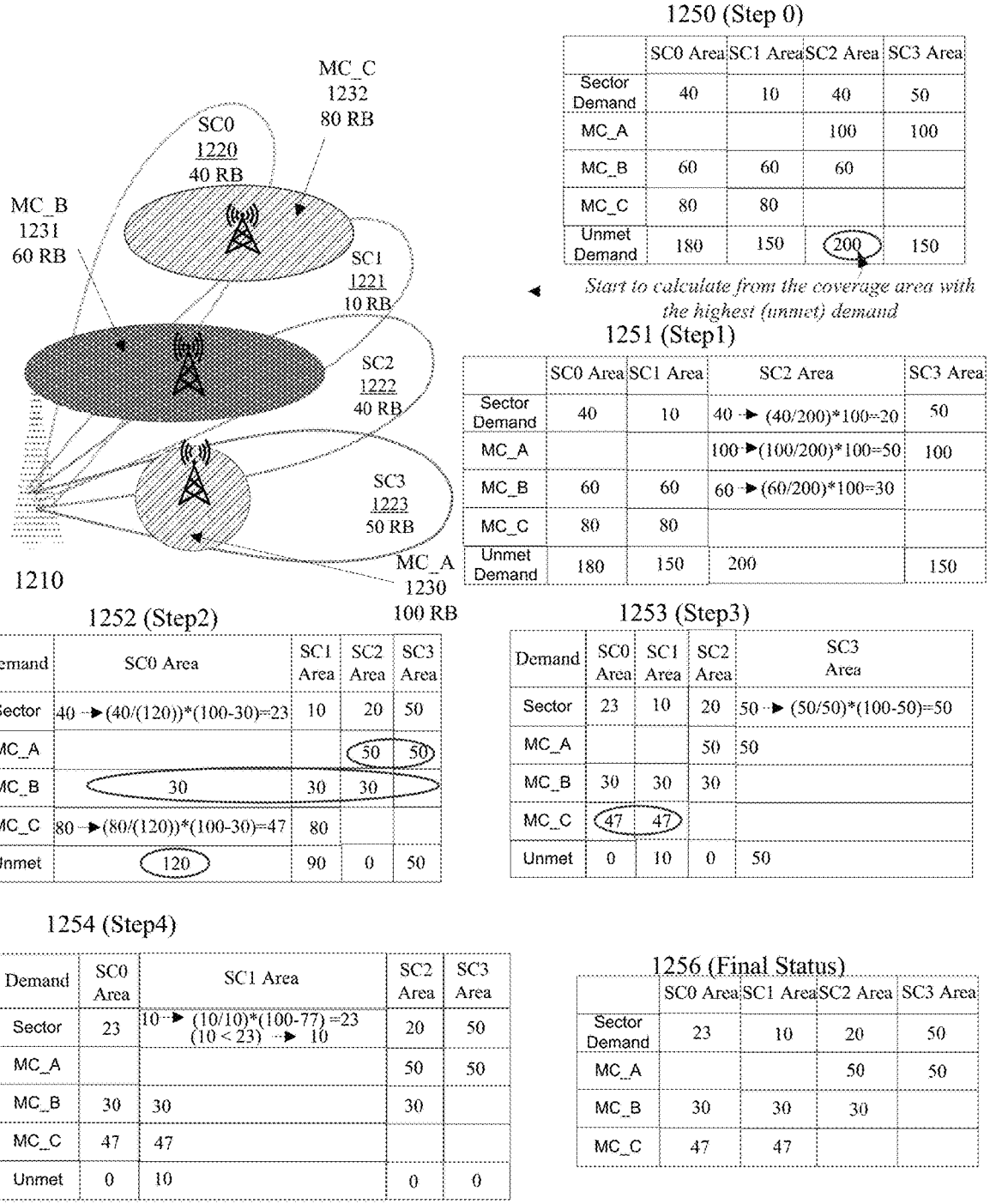
FIG. 12 show a sequence of actions for allocating resource blocks for three macro-cells interfering with four sectors, according to another embodiment.

FIG. 12 show a sequence of actions for allocating resource blocks for three macro-cells (MC_A 1230, MC_B 1231, MC_C 1232) interfering with four sectors (SC0 1220, SC1 1221, SC2 1222, SC3 1223), according to another embodiment.

Application of the first step 810 includes determining which macro-cells interfere with which sectorized supercell base station sectors. FIG. 12 shows the four supercell sectors SC0 1220, SC1 1221, SC2 1222, SC3 1223 of a supercell 1210. Further FIG. 12 shows the interfering microcells MC_A 1230, MC_B 1231, MC_C 1232. Once identified, the number of RBs demanded by users connected to the interfering sectors and macro-cells is determined. As shown, the sector SC0 1220 is demanding 40 RBs, the sector SC1 1221 is demanding 10 RBs, the sector SC2 1222 is demanding 40 RBs, the sector SC3 1223 is demanding 50 RBs, the microcell MC_A 1230 is demanding 100 RBs, the microcell MC_B 1231 is demanding 60 RBs, and the microcell MC_C 1232 is demanding 80 RBs.

Application of the second step 820 includes determining a total demand for all supercell sector coverage areas. As shown in table 1250 (Step 0), the total unmet demand of the SC0 1220 coverage area is 40+60+80=180 RBs, the total unmet demand of the SC1 1221 coverage area is 10+60+80=150 RBs, the total unmet demand of the SC2 1222 coverage area is 40+100+60=200 RBs, and the total unmet demand of the SC3 1223 coverage area is 50+100=150 RBs.

Application of the third step 830 includes picking or selecting the sector coverage area. X with the highest total (unmet) demand. As shown in table 1150, the highest total unmet demand is that of SC2 1222 which is demanding 200 RBs, which is greater than the 150 RBs of the sector SC3, or the 150 RBs of sector SC1, or the 180 RBs of sector SC0.

Application of the fourth step 840 includes normalizing the (unmet) demands in X (SC 2 as determined in table 1250) by the total (unmet) demand. For an embodiment, the includes multiplying normalized values with the number of available RBs to distribute, which yields the grants for the supercell sector itself and to the macro-cell(s) overlapping with X. This is depicted in table 1251 where the grants for the supercell itself (SC1) and the overlapping microcells (MC_A, MC_B) are determined as 20 RBs for SC2 and 50 RBs for MC_A, and 30 RBs for MC_B.

Application of the fifth step 850 includes applying the grants determined for each of the macro-cell(s) overlapping with X (SC2) to all other sectors (SC0, SC1, SC3) that each of the macro-cells is also interfering with. This is depicted in table 1252 (Step 2) as the demand for MC_A in the SC3 coverage area is updated with 50 RBs. Further, the total unmet demand for the SC2 coverage area is update to 0. Further, the demand for MC_B in the SC0 and SC 1 coverage areas is updated to 30 RBs.

Application of the sixth step 860 includes update the total (unmet) demand values in all sector coverage areas by subtracting the demands of interfering macro-cells (table 1252 step 2). For the SC0 area, the total available number of RBs (100) is subtracted by the demands of the interfering macrocell (MC_B) of 30. That is, 100 30=70 RBs still to be allocated. The allocation to SC0 comes to (40/120)*(100−30)=23, as the total unmet demand in SC0 is 120, and SC1 is demanding 40 RBs. The allocation to MC_C comes to (80/70)*(100−30)=47 as the total unmet demand in SC1 is 70, and MC_C is demanding 80 RBs. The unmet demand of SC1 is then updated to 0.

Application of the seventh step 870 includes updating the number of available RBs in all sector coverage areas by subtracting the grants of interfering macro-cells. This is shown in table 1253 (step 3) in which the grants to MC_C are updated to 47 RBs for the SC0 and SC1 areas, and the unmet demand is update to 10 for the SC1 area because all demand except the demand for the SC1 have been allocated.

Application of the eighth step 880 includes repeat steps 830 870 until all "total (unmet) demand" values become 0. As shown in table 1254 the unmet demand for the SC3 area is updated to 0, and a next highest unmet demand is the S13 area with 10 RB. Each of the macro-cells MC_B, MC_C have already been allocated, so the normalized value of the sector SC1 area is calculated as (10/10)*(100−77)=23. However, the SC1 area is only demanding 10 RBs. Therefore, the SC1 area is allocated the lesser demand of 10 RBs.

Table 1256 shows the final resource block (RB) allocation for the macro-cells MC_A, MC_B, MC_C, and the sectors SC0, SC1, SC2, SC3 areas.

FIG. 13 is a flow chart that include steps of a method of distributing resource block between interfering cells, according to an embodiment. A first step 1310 includes allocating resource blocks to a plurality of macro-cells and to at least one of a plurality of sectors of a supercell, wherein the supercell comprises a wireless communication cell that provides wireless coverage to a larger region than the plurality of macro-cells and includes the plurality of sectors, wherein each of the macro-cells provide wireless coverage that at least partially overlaps with a region of wireless coverage of the supercell, wherein the supercell includes one or more supercell sector coverage areas that are interfered by at least one macro-cell. For an embodiment, allocating the resource blocks includes a second step 1320 of determining which of the plurality of macro-cells wirelessly interfere with which of the plurality of sectors, and a third step 1330 of determining, for each interfered sector, a total unmet demand of the interfered sector and interfering macro-cells for a coverage area of the interfered sector.

Determining Interfering Macro-Cells and Sectors of a Supercell

For at least some embodiments, the determining of which of the plurality of macro-cells wirelessly interfere with which of the plurality of sectors is determined as shown and described in FIGS. 4A and 4B.

For an embodiment, the interfering supercell sectors and macro-cells can be determined in various ways including site surveys (drive tests). In the site surveys, devices that are capable of measuring strength of wireless signals from multiple base stations (such as scanners) are used to determine areas where the signal from more than one base station is strong enough to serve users. Based on a previously performed site survey, interfering macro-cells and sectors of supercell base stations can be identified.

For an embodiment, the interfering supercell sectors and macro-cells can also be determined via software capable of estimating the coverage areas of multiple base stations taking into account all relevant parameters such as terrain, clutter, antenna height and propagation losses affecting the signal propagation. The simulation estimated coverage areas can be used to identify macro-cells that interfere with sectors of the supercell base station.

Determining the RB Demand

For an embodiment, the scheduler in the MAC (media access control) layer of each supercell sector and macro-cell knows and keeps track of the resource block needs of users (UEs) connected to that supercell sector or macro-cell. For an embodiment, the number of RBs needed by a user is determined by the amount of data to be downloaded/uploaded as well as the UE's channel conditions, which dictate the modulation order and the coding level. For an embodiment, the scheduler keeps track of the demand coming from all its UEs in the downlink (DL) and in the uplink (UL), e.g. X kilobytes in DL, Y kilobytes in UL. For an embodiment, the scheduler then determines how many resource blocks are needed to transmit that amount of data with the appropriate modulation order and coding scheme. For an embodiment, the scheduler periodically calculates a time averaged value for DL and UL resource blocks needed per transmit-time-interval (TTI). For an embodiment, a central controller that is interfaced with interfering supercell sectors and macro-cells and retrieves this time averaged value (RB demand) from the schedulers of the supercell sectors and the macro-cells.

For an embodiment, the information about the interference relationship between supercell sectors and macro-cells is available to the central controller. For at least some embodiments, the total unmet demand of the interfering sector is determined based on resource block demands of users connected to the interfered sector and the interfering macro-cells.

For an embodiment, the central controller determines the RB allocations based on the processing of the RB demands and the interference relationships and conveys the granted (allocations) to each of the supercell sectors and macro-cells. For at least some embodiments, allocating resource blocks to the plurality of macro-cells and to the at least one of the plurality of sectors of the supercell includes selecting a supercell sector coverage area X having a highest total unmet demand, normalizing a demand of a sector of the plurality of sectors that provides a supercell sector coverage area X with the total unmet demand in the supercell sector coverage area X, wherein the demand of the sector is determined based on resource block demands of users connected to the sector, and multiplying a number of available resource blocks with the normalized demand in the supercell sector coverage area X.

At least some embodiments further include allocating resource blocks to each of the macro-cells that overlap with the supercell sector coverage area X. For at least some embodiments, allocating resource blocks to each of the macro-cells that overlap with the supercell sector coverage area X includes normalizing a demand of each of the macro-cells with the total unmet demand in the supercell sector coverage area X, wherein the demand of each of the macro-cells is determined based on resource block demands of users connected to each of the macro-cells, and multiplying the number of available resource blocks with the normalized demand of each of the macro-cells that overlap with the supercell sector coverage area X.

At least some embodiments further include adjusting a grant of each macro-cell that interferes with other supercell sector coverage areas and that also overlaps with the supercell sector coverage area X, to the allocated number of resource blocks for the macro-cell, wherein the grant is a demand that has been met.

At least some embodiments further include resetting the total unmet demand of the supercell sector coverage area X to zero.

At least some embodiments further include updating the total unmet demand of each of the supercell sector coverage areas, wherein the total unmet demand includes demands of the sector and macro-cells having wireless coverage that overlaps with the wireless coverage of the supercell sector coverage area.

At least some embodiments further include:
A. selecting a next supercell sector coverage area Y having a highest total unmet demand;
B. allocating resource blocks to the supercell sector coverage area Y comprising;
C. normalizing a demand of a sector that provides the supercell sector coverage area Y with the total unmet demand of the supercell sector coverage area Y;
D. multiplying a number of available resource blocks with the normalized demand of the supercell sector coverage area Y, wherein the number of available resource block includes a total number of resource blocks minus a number of resource blocks that have already been granted to macro-cells that interfere with the plurality of supercell sector coverage areas;
E. allocating resource blocks to each of the macro-cells that overlap with the coverage area of the supercell sector coverage area Y comprising:
F. normalizing a demand of each of the macro-cells with the total unmet demand of the supercell sector coverage area Y;
G. multiplying the number of available resource blocks with the normalized demand of each of the macro-cells that overlap with the supercell sector coverage area Y;
H. adjusting a grant of each macro-cell that interferes with other supercell sector coverage areas and that also overlap with the supercell sector coverage area Y, to the allocated number of resource blocks for the micro-cell;
I. resetting the total unmet demand of the supercell sector coverage area Y to zero;
J. updating a total unmet demand of each of the supercell sector coverage areas, wherein the total unmet demand includes demands of the supercell sector and macro-cells having wireless coverage that overlaps with the wireless coverage of the supercell sector coverage area.

At least some embodiments further include repeating steps A-J until the total unmet demand for all supercell sectors coverage areas have been reset to zero.

At least some embodiments further include tracking, by a scheduler, a demand of resource blocks coming from users of the interfered sector and the interfering macro-cells, wherein the tracking comprising tracking user demand in both a downlink direction and in an uplink direction, and determining, by the scheduler, how many resource blocks to wirelessly communicate demanded data with a determined modulation and coding scheme. At least some embodiments further include periodically calculating, by the scheduler, a time average value for downlink and uplink resource blocks needed per a transmit-time-interval, wherein a demand for each user is determined based on the time average value of the downlink and uplink resource blocks needed per a transmit-time-interval, and wherein the demand for each user is used to determine the demand of resource blocks of users of the interfered sector and the interfering macro-cells. At least some embodiments further include retrieving, by a central controller, the demand for each user from the scheduler, wherein the central controller performs the allocating of the resource blocks. As previously described, the demands of the users are used to determine the demand of each of the macro-cells and each of the sectors of the supercell base station. As described, these demands are then used for the allocations of the resource blocks to the macro-cells and the sectors of the supercell base station.

Although specific embodiments have been described and illustrated, the embodiments are not to be limited to the specific forms or arrangements of parts so described and illustrated. The described embodiments are to only be limited by the claims.

What is claimed:

1. A method comprising:
   allocating resource blocks to a plurality of macro-cells and to at least one of a plurality of sectors of a supercell, wherein the supercell comprises a wireless communication cell that provides wireless coverage to a larger region than the plurality of macro-cells and includes the plurality of sectors, wherein each of the macro-cells provide wireless coverage that at least partially overlaps with a region of wireless coverage of the supercell;
   wherein the supercell includes one or more supercell sector coverage areas that are interfered by at least one macro-cell;
   wherein allocating the resource blocks comprises:
   determining which of the plurality of macro-cells wirelessly interfere with which of the plurality of sectors; and
   determining, based on a coverage area of each interfered sector, a total unmet demand for resource blocks of the interfered sector and of the interfering macro-cells.

2. The method of claim 1, wherein the total unmet demand is determined based on resource block demands of users connected to the interfered sector and the interfering macro-cells.

3. The method of claim 1, wherein allocating resource blocks to the plurality of macro-cells and to the at least one of the plurality of sectors of the supercell comprises: selecting a supercell sector coverage area X having a highest total unmet demand; normalizing a demand of a sector of the plurality of sectors that provides a supercell sector coverage area X with the total unmet demand in the supercell sector coverage area X, wherein the demand of the sector is determined based on resource block demands of users connected to the sector; and multiplying a number of available resource blocks with the normalized demand in the supercell sector coverage area X.

4. The method of claim 3, further comprising: allocating resource blocks to each of the macro-cells that overlap with the supercell sector coverage area X comprising: normalizing a demand of each of the macro-cells with the total unmet demand in the supercell sector coverage area X, wherein the demand of each of the macro-cells is determined based on resource block demands of users connected to each of the macro-cells; and multiplying the number of available resource blocks with the normalized demand of each of the macro-cells that overlap with the supercell sector coverage area X.

5. The method of claim 4, further comprising: adjusting a grant of each macro-cell that interferes with other supercell sector coverage areas and that also overlaps with the supercell sector coverage area X, to the allocated number of resource blocks for the macro-cell, wherein the grant is a demand that has been met.

6. The method of claim 5, further comprising: resetting the total unmet demand of the supercell sector coverage area X to zero.

7. The method of claim 5, further comprising: updating the total unmet demand of each of the supercell sector coverage areas, wherein the total unmet demand includes demands of the sector and macro-cells having wireless coverage that overlaps with the wireless coverage of the supercell sector coverage area.

8. The method of claim 7, further comprising: a. selecting a next supercell sector coverage area Y having a highest total unmet demand; b. allocating resource blocks to the supercell sector coverage area Y comprising: c. normalizing a demand of a sector that provides the supercell sector coverage area Y with the total unmet demand of the supercell sector coverage area Y; d. multiplying a number of available resource blocks with the normalized demand of the supercell sector coverage area Y, wherein the number of available resource block includes a total number of resource blocks minus a number of resource blocks that have already been granted to macro-cells that interfere with the plurality of supercell sector coverage areas; e. allocating resource blocks to each of the macro-cells that overlap with the coverage area of the supercell sector coverage area Y comprising: f. normalizing a demand of each of the macro-cells with the total unmet demand of the supercell sector coverage area Y; g. multiplying the number of available resource blocks with the normalized demand of each of the macro-cells that overlap with the supercell sector coverage area Y; h. adjusting a grant of each macro-cell that interferes with other supercell sector coverage areas and that also overlap with the supercell sector coverage area Y, to the allocated number of resource blocks for the micro-cell; i. resetting the total unmet demand of the supercell sector coverage area Y to zero; j. updating a total unmet demand of each of the supercell sector coverage areas, wherein the total unmet demand includes demands of the supercell sector and macro-cells having wireless coverage that overlaps with the wireless coverage of the supercell sector coverage area.

9. The method of claim 8, further comprising repeating steps a-j until the total unmet demand for all supercell sectors coverage areas have been reset to zero.

10. The method of claim 2, further comprising: tracking, by a scheduler, a demand of resource blocks coming from users of the interfered sector and the interfering macro-cells, wherein the tracking comprising tracking user demand in both a downlink direction and in an uplink direction; and determining, by the scheduler, how many resource blocks to wirelessly communicate demanded data with a determined modulation and coding scheme.

11. The method of claim 10, further comprising: periodically calculating, by the scheduler, a time average value for downlink and uplink resource blocks needed per a transmit-time-interval; wherein a demand for each user is determined based on the time average value of the downlink and uplink resource blocks needed per a transmit-time-interval; wherein the demand for each user is used to determine the demand of resource blocks of users of the interfered sector and the interfering macro-cells.

12. The method of claim 11, further comprising: retrieving, by a central controller, the demand for each user from the scheduler; wherein the central controller performs the allocating of the resource blocks.

13. A wireless network comprising:
    a supercell, the supercell providing wireless coverage of a region;

a plurality of macro-cells that provide wireless coverage that cover and interfere with at least some sectors of the supercell;
wherein the supercell comprises a wireless communication cell that provides wireless coverage to a larger region than the plurality of macro-cells and includes a plurality of sectors,
wherein each of the macro-cells provide wireless coverage that at least partially overlaps with a region of wireless coverage of the supercell,
wherein the supercell includes one or more supercell sector coverage areas that are interfered by at least one macro-cell;
a central controller that is interfaced with the supercell and the plurality of macro-cells, the central controller comprising a processor, the central controller operative to:
allocate resource blocks to a plurality of macro-cells and to a plurality of supercell sectors of a supercell, comprising the central controller operating to:
determine which of the plurality of macro-cells wirelessly interfere with which of the plurality of sectors; and
determine, based on a coverage area of each interfered sector, a total unmet demand for resource blocks of the interfered sector and of the interfering macro-cells.

14. The wireless network of claim 13, wherein allocating resource blocks to the plurality of macro-cells and to the plurality of supercell sectors of the supercell comprises the central controller further operating to: select a supercell sector coverage area X having a highest total unmet demand; normalize a demand of a sector of the plurality of sectors that provides a supercell sector coverage area X with the total unmet demand in the supercell sector coverage area X, wherein the demand of the sector is determined based on resource block demands of users connected to the sector; and multiply a number of available resource blocks with the normalized demand in the supercell sector coverage area X.

15. The wireless network of claim 14, further comprising the central controller operating to: allocate resource blocks to each of the macro-cells that overlap with the supercell sector coverage area X comprising: normalizing a demand of each of the macro-cells with the total unmet demand in the supercell sector coverage area X, wherein the demand of each of the macro-cells is determined based on resource block demands of users connected to each of the macro-cells; multiplying the number of available resource blocks with the normalized demand of each of the macro-cells that overlap with the supercell sector coverage area X.

16. The wireless network of claim 15, further comprising the central controller operating to: adjust a grant of each macro-cell that interferes with other supercell sector coverage areas and that also overlaps with the supercell sector coverage area X, to the allocated number of resource blocks for the macro-cell, wherein the grant is a demand that has been met.

17. The wireless network of claim 16, further comprising the central controller operating to: reset the total unmet demand of the supercell sector coverage area X to zero.

18. The wireless network of claim 16, further comprising the central controller operating to: update the total unmet demand of each of the supercell sector coverage areas, wherein the total unmet demand includes demands of the sector and macro-cells having wireless coverage that overlaps with the wireless coverage of the supercell sector coverage area.

19. The wireless network of claim 18, further comprising the central controller operating to: select a next supercell sector coverage area Y having a highest total unmet demand; allocate resource blocks to the supercell sector coverage area Y comprising: normalize a demand of a sector that provides the supercell sector coverage area Y with the total unmet demand of the supercell sector coverage area Y; multiply a number of available resource blocks with the normalized demand of the supercell sector coverage area Y, wherein the number of available resource block includes a total number of resource blocks minus a number of resource blocks that have already been granted to macro-cells that interfere with the plurality of supercell sector coverage areas; allocate resource blocks to each of the macro-cells that overlap with the coverage area of the supercell sector coverage area Y comprising: normalize a demand of each of the macro-cells with the total unmet demand of the supercell sector coverage area Y; multiply the number of available resource blocks with the normalized demand of each of the macro-cells that overlap with the supercell sector coverage area Y; adjust a grant of each macro-cell that interferes with other supercell sector coverage areas and that also overlap with the supercell sector coverage area Y, to the allocated number of resource blocks for the micro-cell; reset the total unmet demand of the supercell sector coverage area Y to zero; update a total unmet demand of each of the supercell sector coverage areas, wherein the total unmet demand includes demands of the supercell sector and macro-cells having wireless coverage that overlaps with the wireless coverage of the supercell sector coverage area.

20. The wireless network of claim 13, further comprising a scheduler, the scheduler operating to: track a demand of resource blocks coming from users of the interfered sector and the interfering macro-cells, wherein the tracking comprising tracking user demand in both a downlink direction and in an uplink direction; determine how many resource blocks to wirelessly communicate demanded data with a determined modulation and coding scheme; and periodically calculate a time average value for downlink and uplink resource blocks needed per a transmit-time-interval; wherein a demand for each user is determined based on the time average value of the downlink and uplink resource blocks needed per a transmit-time-interval; wherein the demand for each user is used to determine the demand of resource blocks of users of the interfered sector and the interfering macro-cells.

* * * * *